United States Patent
Plattner et al.

(10) Patent No.: US 9,256,839 B2
(45) Date of Patent: Feb. 9, 2016

(54) BUSINESS OBJECT BASED NAVIGATION

(75) Inventors: Hasso Plattner, Schriesheim (DE); Alexander Zeier, Berlin (DE); Matthias Uflacker, Potsdam (DE); Cafer Tosun, Mannheim (DE); Janek Schumann, Borkheide (DE); Kok Thim Chew, San Mateo, CA (US)

(73) Assignee: HASSO-PLATTNER-INSTITUT FUR SOFTWARESYSTEMTECHNIK GMBH, Potsdam (DE)

( * ) Notice: Subject to any disclaimer, the term of this patent is extended or adjusted under 35 U.S.C. 154(b) by 277 days.

(21) Appl. No.: 12/776,174

(22) Filed: May 7, 2010

(65) Prior Publication Data

US 2010/0287145 A1 Nov. 11, 2010

Related U.S. Application Data

(60) Provisional application No. 61/176,967, filed on May 11, 2009.

(30) Foreign Application Priority Data

May 11, 2009 (EP) .................................... 09159936

(51) Int. Cl.
*G06F 17/30* (2006.01)
*G06Q 10/00* (2012.01)

(52) U.S. Cl.
CPC .......... *G06Q 10/00* (2013.01); *G06F 17/30126* (2013.01); *G06F 17/30604* (2013.01)

(58) Field of Classification Search
CPC .................. G06F 17/30126; G06F 17/30601; G06F 17/30604
USPC ........................................................ 707/736
See application file for complete search history.

(56) References Cited

U.S. PATENT DOCUMENTS

| 6,993,533 | B1* | 1/2006 | Barnes | |
| 7,188,100 | B2* | 3/2007 | De Bellis | G06F 17/30395 707/706 |
| 7,702,582 | B2* | 4/2010 | Hatano | G06Q 20/02 705/40 |
| 2002/0069215 | A1* | 6/2002 | Orbanes | G06F 3/0346 715/233 |
| 2002/0194087 | A1* | 12/2002 | Spiegel et al. | 705/26 |
| 2004/0083206 | A1* | 4/2004 | Wu | G06F 17/30643 |
| 2008/0319942 | A1* | 12/2008 | Courdy | G06F 19/322 |
| 2009/0187552 | A1* | 7/2009 | Pinel | G06F 17/30392 |

OTHER PUBLICATIONS

"Using SQL views and stored procedures with DB2 Web query", IBM white paper, Jan. 2008.*
Extended Search Report, from a corresponding foreign application, Application No. 09159936.5.

* cited by examiner

*Primary Examiner* — Miranda Huang
(74) *Attorney, Agent, or Firm* — Fountainhead Law Group P.C.

(57) ABSTRACT

In one embodiment the present invention relates to a method for navigating within a database containing business objects. The method includes the steps of providing a preconfigured model comprising preconfigured business object types and preconfigured associations of the business object types, identifying a reference to a business object instance within a software object and determining a primary business object type corresponding to the business object instance, providing links to at least one secondary business object type associated with the primary business object type in accordance with the preconfigured business model, and retrieving from the database at least one attribute of at least one business object instance within the secondary business object type associated to the primary business object type in accordance with the preconfigured model. In this manner, a user may more easily navigate the database.

20 Claims, 9 Drawing Sheets

BUSINESS OBJECT BASED NAVIGATION

CROSS REFERENCE TO RELATED APPLICATIONS

The present application claims priority to U.S. Provisional App. No. 61/176,967 filed May 11, 2009 titled "Business Object Based Navigation", and to European Patent Application No. 09 159 936.5 filed May 11, 2009 titled "Business Object Based Navigation", which are incorporated herein by reference.

BACKGROUND

The present invention relates to an improved method for navigating within a database, and in particular within a database containing business objects and using a business object model.

Unless otherwise indicated herein, the approaches described in this section are not prior art to the claims in this application and are not admitted to be prior art by inclusion in this section.

Enterprise applications, such as SAP Business ByDesign™, use databases for storing business objects as well as their associations. Navigation within such databases, which store business objects relating to many different aspects of the business, often is slow and cumbersome for the user, who is presented with a lot of uninteresting or unwanted information. In particular, the user must follow the associations between the business object while navigating the database.

SUMMARY

Embodiments of the present invention improve the navigation of databases. In one embodiment, the present invention relates to a computer-implemented method for navigating within a database containing business object instances. The method includes using, by a computer system, a preconfigured model comprising preconfigured business object types and preconfigured associations of the business object types. The method further includes identifying, by the computer system, a reference to a business object instance within a software object and determining a primary business object type corresponding to the business object instance. The method further includes determining, by the computer system, at least one secondary business object type associated with the primary business object type in accordance with the preconfigured model.

According to an embodiment, the present invention relates to a computer system for navigating within a database containing business object instances. The computer system includes a storage system and a processor system. The storage system is configured to store the database containing the business object instances. The processor system is configured to use a preconfigured model comprising preconfigured business object types and preconfigured associations of the business object types, to identify a reference to a business object instance within a software object, to determine a primary business object type corresponding to the business object instance, and to determine at least one secondary business object type associated with the primary business object type in accordance with the preconfigured model.

According to an embodiment, the present invention relates to a computer program embodied in a tangible recording medium that is configured to control a computer system to execute processing for navigating within a database containing business object instances. The computer program includes a database application, an enterprise application, and a navigation application. The database application is configured to control the computer system to store the database containing the business object instances. The enterprise application is configured to control the computer system to use a preconfigured model comprising preconfigured business object types and preconfigured associations of the business object types. The navigation application is configured to control the computer system to identify a reference to a business object instance within a software object, to determine a primary business object type corresponding to the business object instance, and to determine at least one secondary business object type associated with the primary business object type in accordance with the preconfigured model.

The following detailed description and accompanying drawings provide a better understanding of the nature and advantages of the present invention.

DETAILED DESCRIPTION

Figure 1:
FIG. 1 is a diagram of an email message used to illustrate an embodiment of the present invention.

Described herein are techniques for navigating databases. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

As discussed in the background, the user must follow the associations between the business object while navigating the database. This often prevents the user from quickly retrieving information relevant for his current task, since he or she must browse through all the provided information and disregard the information which is of no interest.

It is therefore an object of the present invention to provide a method for navigating within databases containing business objects in order to quickly identify information of interest relating to business objects. This object is solved by a method for navigating within a database according to the present invention.

A method for navigating within a database according to an embodiment of the present invention is in particular suitable for databases containing business objects and using a business object model, provided by enterprise applications.

The method according to an embodiment of the invention comprises as a first step providing a preconfigured model comprising a number of business object types and preconfigured associations between the business object types. The preconfigured business object types and the associations of the business object types can be defined by the user or by an expert. It is also possible, that an expert defines a base set of preconfigured business object types and associations of the business object types and the user may add his own definitions to the base set.

An example of such a preconfigured model may be a business object type relating to invoices, where the business object instances then relate to the individual invoices in the database. The associations of the business object types in this example should be understood to be an indication of a relationship between the business object type "supplier invoice" and at least a further business object type that is associated with the business object type "supplier invoice". The association therefore may for example be to a "purchase order" or to a "material" used in manufacturing the items to be invoiced. Accordingly, a second business object type could be "material". The second business object type "material" identifies a number of business object instances representing the individual materials used during manufacturing. The user will then be presented with the individual materials used in the "supplier invoice". A more detailed example will be given further below.

This preconfigured model in the first step reduces the set of available associations of business object types to a set suitable for quickly browsing the database and retrieving interesting information therefrom.

The preconfigured business model can be used to supersede the structure used in the business object model of the database, which often have a form that is technical and difficult to understand. Accordingly, the preconfigured business model is capable of providing the user with easily understandable business object types and their associations in order to quickly and effectively identify business objects or business object instances which are of interest.

In a further step of the method according to an embodiment of the invention, a reference to a business object instance within a software object is identified. A software object can be any representation of information or data regardless of whether it is structured or unstructured or both. The identification of a business object instance is achieved based on the recognition of at least one attribute of the business object instance within the software object.

The software object can be a text file (such as a Microsoft Word™ file) or an email, or the software object can represent structured content (such as an XML [extensible markup language] file), for example relating to a business object that a user views in an enterprise application.

Once a business object instance has been identified, according to an embodiment of the present invention either all of the attributes of the business object instance are retrieved from the database, or just a subset of the attributes are retrieved from the database. According to an embodiment, it is sufficient to only determine the business object type corresponding to the referenced or identified business object instance. The retrieved business object type will in the following be referred to as the identified or primary business object type.

If an attribute of the identified business object instance is retrieved then the information of such attribute is preferably displayed.

In a further step of the method according to an embodiment of the invention, further business object types are determined which differ from, but are associated with the primary business object type corresponding to the referenced business object instance. These further business object types are determined on the basis of the preconfigured business model by evaluating the associations of the business object types. We will refer to these further business object types as secondary business object types.

The secondary business object types, which are associated with the primary business object type corresponding to the referenced or identified business object instance, are then presented to the user. The user may select any one of the secondary business object types, and by doing so can view the individual business object instances within the selected secondary business object type, which are related to the primary business object instance. Accordingly, the retrieval of the business object instances of each of the secondary business object type from the database will consider the primary business object instance in its database query.

This step allows the user to quickly identify the most important types of business objects associated with the primary business object type corresponding to the identified business object instance, and to view the business object instances of each of the secondary business object types that are related to the primary business object instance.

In a preferred embodiment of this further step of the method according to the invention, business object instances within the secondary business object type may be retrieved from the database.

In another preferred embodiment, retrieving from the database the business object instances, or just a subset of the attributes of each business object instance, comprises displaying all of the attributes or a subset thereof which relate to the business object instances within the secondary business object type, so that the user is given at least some information regarding the individual business object instances. Thus, the user can quickly view the business object instances within the secondary business object type.

By subsequently selecting the links to other associated business object types (if any), the user is provided with an overview of the most important business object instances within the respective other secondary business object type.

In a preferred embodiment of the method according to the invention, upon selection of a link to a secondary business object type by the user, the secondary business object type corresponding to the selected link is considered to constitute a new primary business object type, and the steps of providing links to preconfigured business object types and of retrieving business object instances as discussed above are repeated. If the business object instance within the primary business object type has been retrieved from the database and information relating to it has been displayed, these steps are also repeated.

Accordingly, the business object instance within the new primary (former secondary) business object type (as a whole or one or more attributes, or other information relating to the business object instance) is retrieved from the database and information relating to the business object instances within the new primary (former secondary) business object type can be displayed. Links to business object types associated with the new primary business object type via preconfigured associations of the business object types are also provided to the user.

Considering a selected secondary business object type to constitute a new primary business object type and performing the above-discussed steps may be repeated as often as necessary in order to move through the preconfigured model and thereby browse through the database and gathering information the user is interested in.

An example of a preferred embodiment of the present invention will be explained in the following, having regard to the accompanying figures.

FIG. 1 is a diagram of an email message used to illustrate an embodiment of the present invention. In this example, the user receives an email message (1) informing him about an important purchase request made by a client. The email message (1) contains a shopping cart number (2), identifying the shopping cart of the purchase request in the enterprise application. However, instead of opening the enterprise application and browsing to the mentioned shopping cart, the user can activate a navigation application implementing the browsing method according to an embodiment of the present invention. Alternatively, the navigation application may already be running in the background.

The navigation application detects that the email message (1) has been opened and tries to extract relevant context information from the email message (1). In this example, the navigation application determines that the email message relates to a purchase request and identifies the shopping cart number (2).

Figure 2:
FIG. 2 is a diagram showing a purchase request used to illustrate an embodiment of the present invention.

FIG. 2 is a diagram showing a purchase request used to illustrate an embodiment of the present invention. The navigation application then displays some basic information (3) about the email message (1) and presents the user with two links (4 and 5); one link (4) for requests contained in the email message (1), and the other link (5) for materials referenced in these requests.

Figure 3:
FIG. 3 is a diagram showing a shopping cart used to illustrate an embodiment of the present invention.
Figure 4:
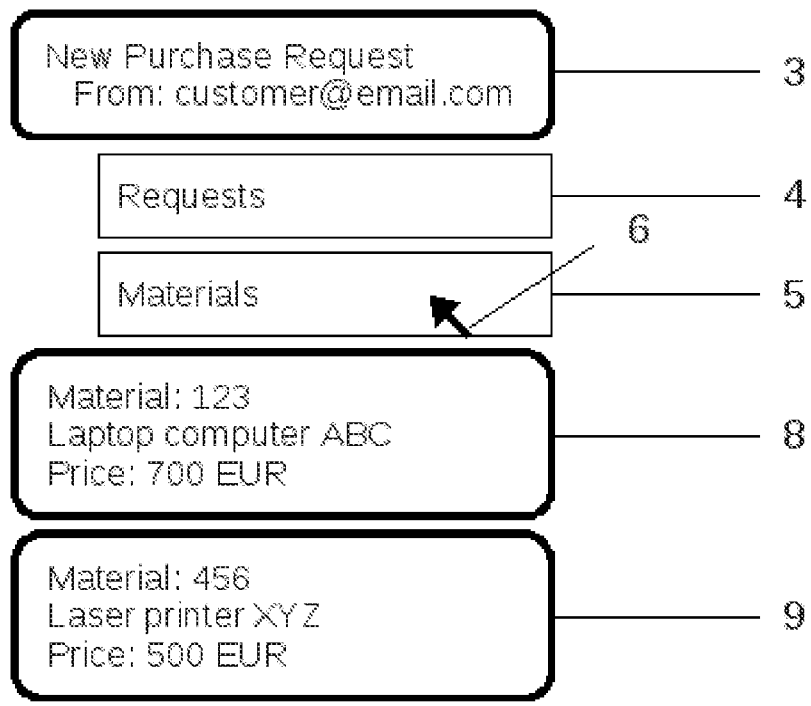
FIG. 4 is a diagram showing materials used to illustrate an embodiment of the present invention.

FIG. 3 is a diagram showing a shopping cart used to illustrate an embodiment of the present invention, and FIG. 4 is a diagram showing materials used to illustrate an embodiment of the present invention. If the user selects one of the links (by moving the mouse cursor (6) over it or by clicking on it), the navigation application either displays some basic information (7) about the shopping carts (in this example only one is shown) or about the materials (8 and 9) referenced therein (in this example a laptop computer (8) and a printer (9)), depending on the link selected by the user.

If the user selects the window containing basic information about the shopping cart (7), he is presented with further links to information relevant for the corresponding material (e.g., shopping cart identifier, value, date, etc.). If the user selects one of the windows containing basic information about the materials (8, 9), he is presented with further links to information relevant for the corresponding material (e.g., material number, material name, price, etc.).

Figure 5:
FIG. 5 is a diagram showing further details of the shopping card used to illustrate an embodiment of the present invention.

FIG. 5 is a diagram showing further details of the shopping card used to illustrate an embodiment of the present invention. In this example, the user selects the window containing basic information about the shopping cart (7). The navigation application then presents the user with three links (10, 11, 12) to business objects relevant for a shopping cart; the first link (10) to items contained in the shopping cart, the second link (11) to previous quotes for these items, and the third link (12) to potential suppliers for these items.

Figure 6:
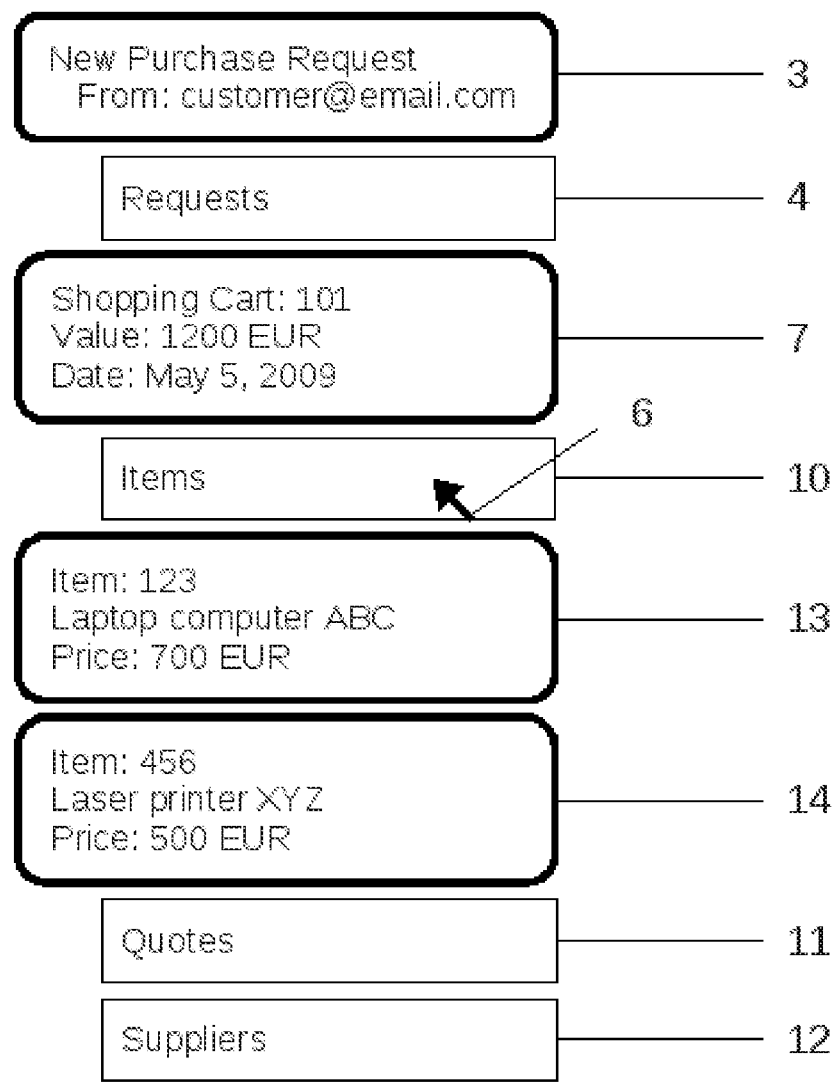
FIG. 6 is a diagram showing further details when the user selects the items link (10) in FIG. 5, to illustrate an embodiment of the present invention.

FIG. 6 is a diagram showing further details when the user selects the items link (10) in FIG. 5, to illustrate an embodiment of the present invention. In this example, the user selects the link (10) to items contained in the shopping cart. The navigation application then presents the user with two windows (13, 14) displaying some basic information about the items contained in the shopping cart, a laptop computer (13) and a printer (14).

Figure 7:
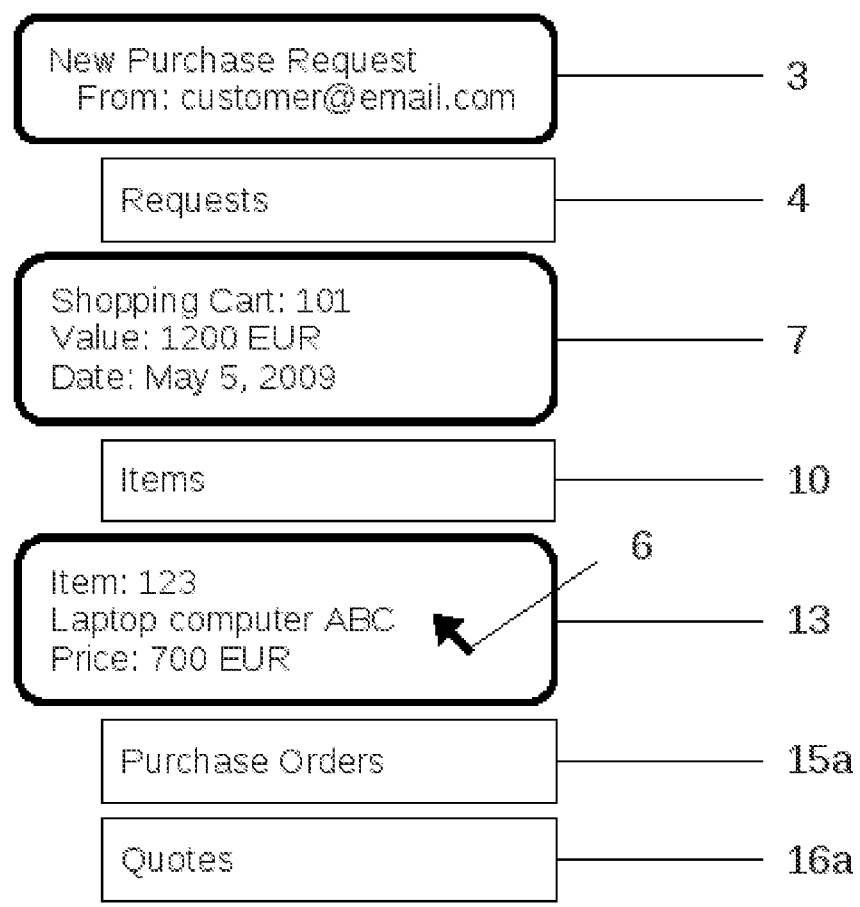
FIG. 7 is a diagram showing further details when the user selects the items link (13) in FIG. 6, to illustrate an embodiment of the present invention.

FIG. 7 is a diagram showing further details when the user selects the items link (13) in FIG. 6, to illustrate an embodiment of the present invention. Upon selection of the items link (13), the user is presented with links to business objects associated with and relevant for the item, for example a former purchase order (15a) for this item or a quote (16a) for this item. By selecting one of these links, the user may quickly get an overview; e.g., whether this item has been included in former purchase orders, or whether quotes for this item have been formerly prepared. Thus, the user can see, whether he may be able to re-use some of this information, or has to collect the relevant information from scratch.

Figure 8:
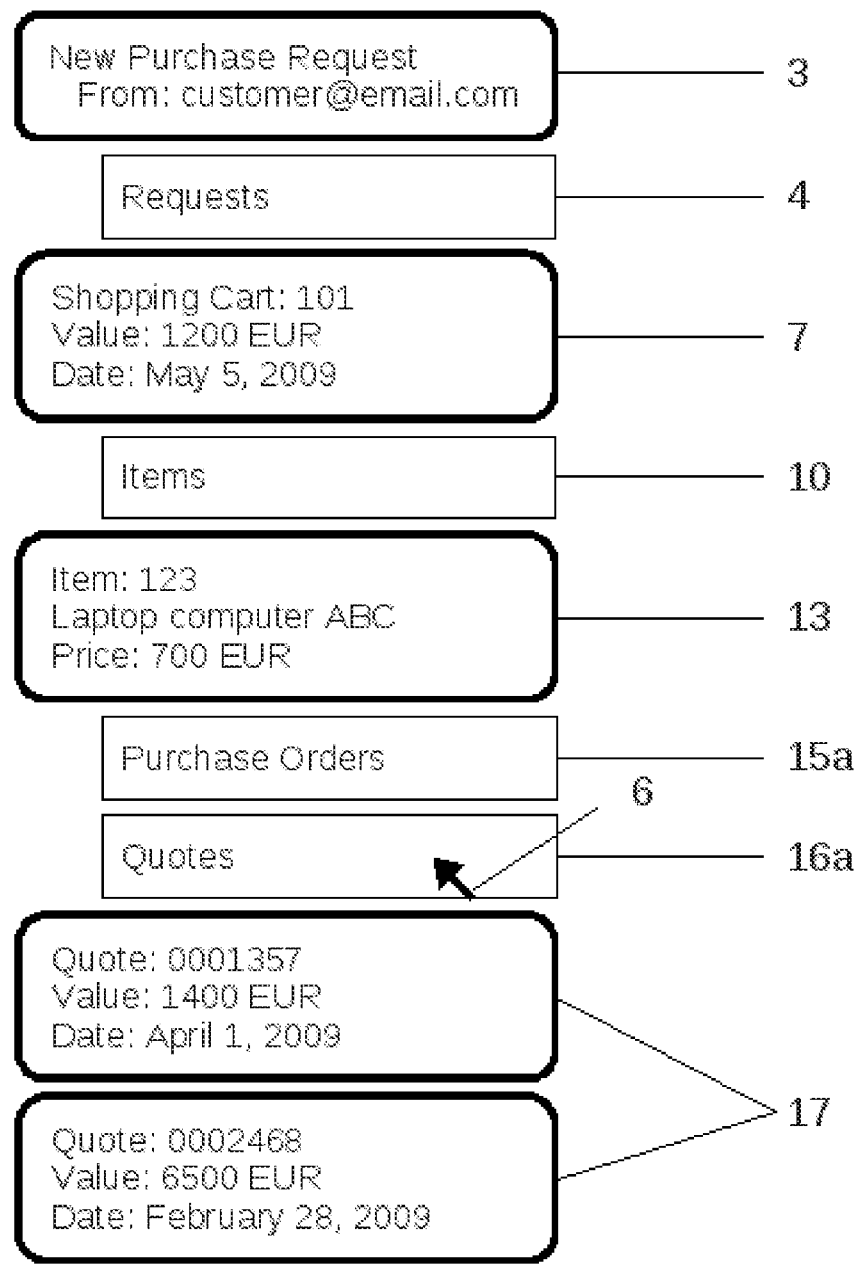
FIG. 8 is a diagram showing further details when the user selects the quotes link (16a) for the laptop computer link (13) in FIG. 7, to illustrate an embodiment of the present invention.

FIG. 8 is a diagram showing further details when the user selects the quotes link (16a) for the laptop computer link (13) in FIG. 7, to illustrate an embodiment of the present invention. In the example, the user can see that quotes (17) for the laptop computer have already been prepared.

Figure 9:
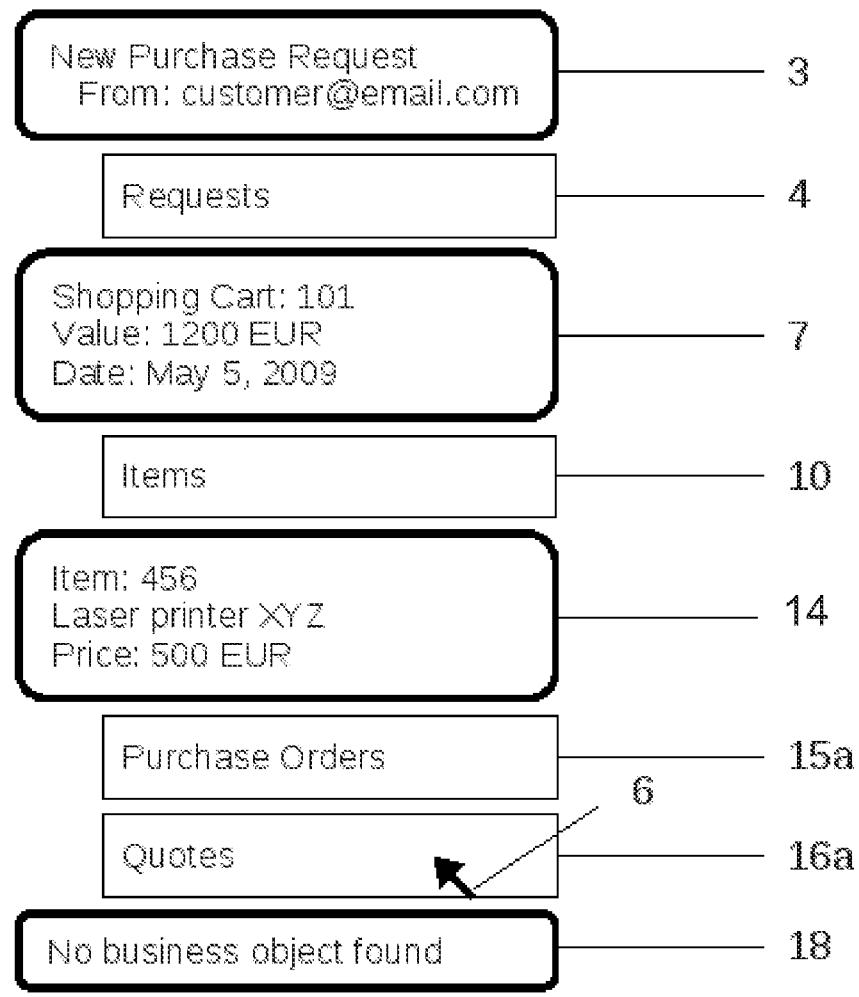
FIG. 9 is a diagram showing further details when the user selects the quotes link (16a) for the printer link (14) in FIG. 6, to illustrate an embodiment of the present invention.

FIG. 9 is a diagram showing further details when the user selects the quotes link (16a) for the printer link (14) in FIG. 6, to illustrate an embodiment of the present invention. In the example, the user can see there have been no quotes (18) for the printer.

Figure 10:
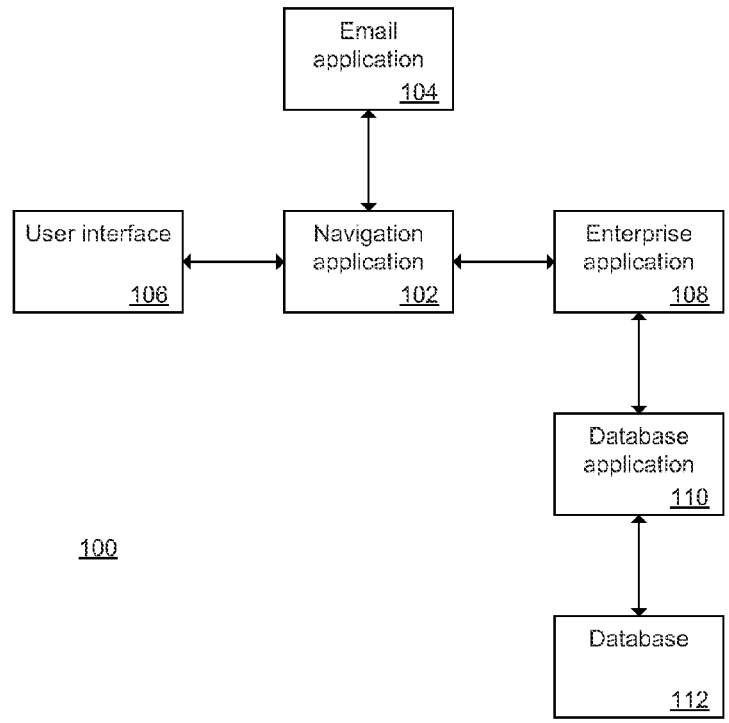
FIG. 10 is a block diagram of a software system according to an embodiment of the present invention.

FIG. 10 is a block diagram of a software system 100 according to an embodiment of the present invention. The software system 100 includes a navigation application 102, an email application 104, a user interface application 106, an enterprise application 108, a database application 110, and a database 112. The software system 100 may include other components, a description of which is omitted for brevity. The software system 100, or parts thereof, may be executed by a computer system (see, e.g., FIG. 11). The software system 100, or parts thereof, may be stored on a tangible medium, such as a memory circuit, a disk drive, a DVD-ROM, etc.

The navigation application 102 operates generally as described above, e.g., to help the user navigate through the information in the database 112. The email application 104 provides one way for the user to interact with the navigation application 102, e.g., as an interface for the user to interact with purchase orders as described above. The email application 104 may provide other information to the user as related to the business objects in the database 112. The user interface application 106 provides another user interface to the navigation application 102. The user interface application 106 may be a document editor (e.g., Microsoft Word™), an information editor (e.g., an XML editor), a web browser, etc. The email application 104 or the user interface application 106 may operate to display the information generated by the navigation application 102.

The enterprise application 108 operates generally as described above, e.g., to manage the interaction between the navigation application 102 and the database application 110. The enterprise application 108 may perform other functions, such as those performed by a SAP Business ByDesign™ system. The user may also interact with the enterprise application 108 without the navigation application 102 as an intermediary; however as described above, use of the navigation application improves the efficiency of the user to interact with business objects.

The database application 110 generally provides interoperability between the enterprise application 108 and the database 112. For example, the database application 110 may implement a database system such as an IBM DB2™ database system, an Informix™ database system, a MaxDB™ database system, an Oracle™ database system, a Microsoft SQL Server™ database system, etc. According to an embodiment, the database application 110 may be an integrated part of the enterprise application 108.

The database 112 generally provides a persistent store for the data corresponding to the business objects. The database may also store other data used by the software system 100.

Figure 11:
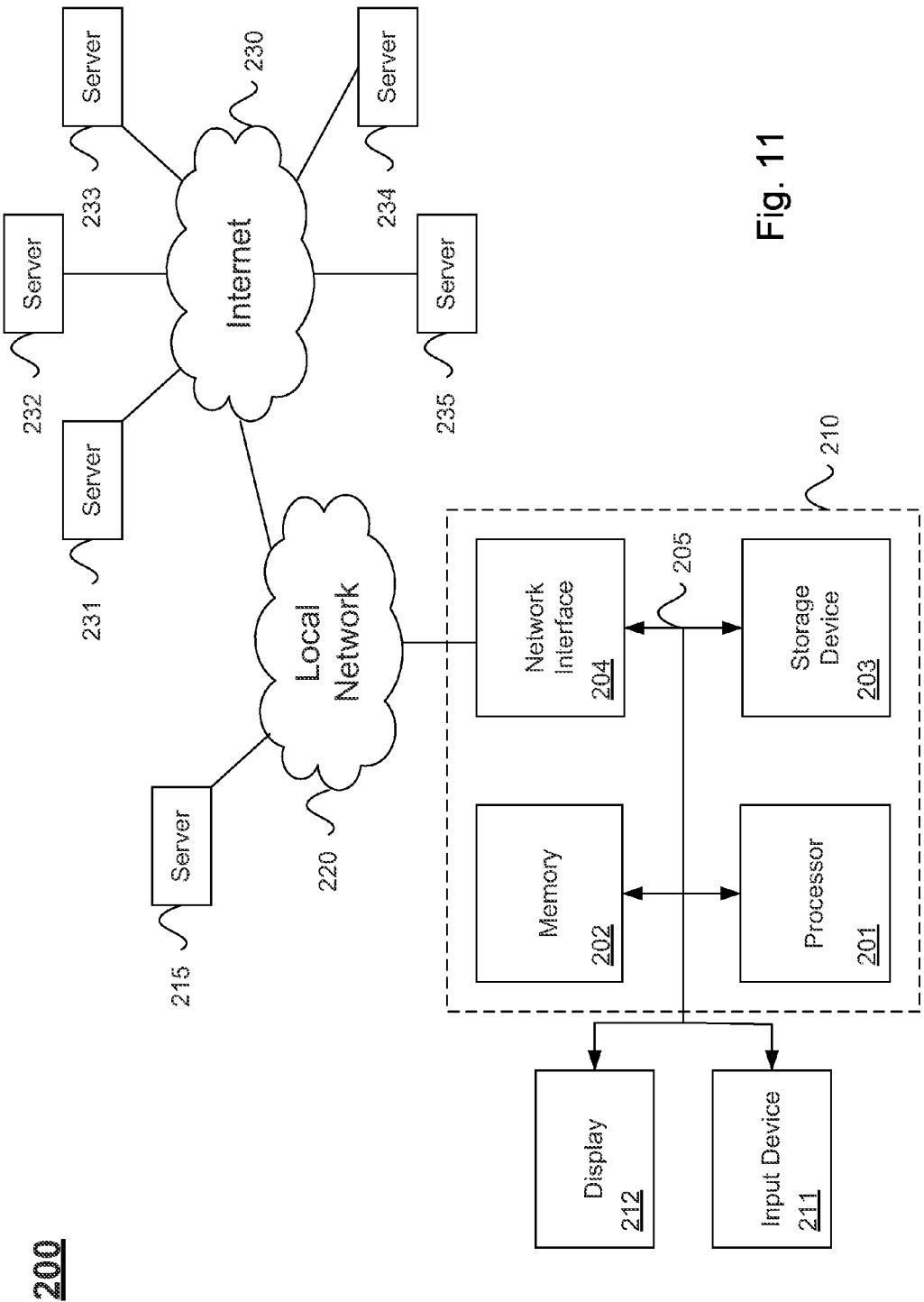
FIG. 11 is a block diagram of a computer system and network according to an embodiment of the present invention.

FIG. 11 is a block diagram of a computer system and network 200 according to an embodiment of the present invention. Computer system 210 includes a bus 205 or other communication mechanism for communicating information, and a processor 201 coupled with bus 205 for processing information. Computer system 210 also includes a memory 202 coupled to bus 205 for storing information and instructions to be executed by processor 201, including information and instructions for performing the techniques described above. This memory may also be used for storing temporary variables or other intermediate information during execution of instructions to be executed by processor 201. Possible implementations of this memory may be, but are not limited to, random access memory (RAM), read only memory (ROM), or both. A storage device 203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 203 may include source code, binary code, or software files for performing the techniques or embodying the constructs above, for example.

Computer system 210 may be coupled via bus 205 to a display 212, such as a cathode ray tube (CRT) or liquid crystal display (LCD), for displaying information to a computer user. An input device 211 such as a keyboard and/or mouse is coupled to bus 205 for communicating information and command selections from the user to processor 201. The combination of these components allows the user to communicate with the system. In some systems, bus 205 may be divided into multiple specialized buses.

Computer system 210 also includes a network interface 204 coupled with bus 205. Network interface 204 may provide two-way data communication between computer system 210 and the local network 220. The network interface 204 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 204 sends and receives electrical, electromagnetic, or optical signals that carry digital data streams representing various types of information.

Computer system 210 can send and receive information, including messages or other interface actions, through the network interface 204 to an Intranet or the Internet 230. In the Internet example, software components or services may reside on multiple different computer systems 210 or servers 231, 232, 233, 234 and 235 across the network. A server 231 may transmit actions or messages from one component, through Internet 230, local network 220, and network interface 204 to a component on computer system 210. The servers 215, 231, 232, 233, 234 or 235 may include components similar to those of the computer system 210.

The computer system and network 200, or components thereof, may implement one or more of the functions described above with reference to FIG. 1 through FIG. 10. For example, the computer system 210 may implement the email application 104 and the user interface application 106; the computer system 210 may implement the navigation application 102; the server 231 may implement the enterprise application 108; the server 231 may implement the navigation application 102; the server 232 may implement the database application 110; or a storage device (not shown) connected to the server 232 may implement the database 112. The computer system and network 200, or components thereof, may perform one or more portions of the method 300 (see FIG. 12).

Figure 12:
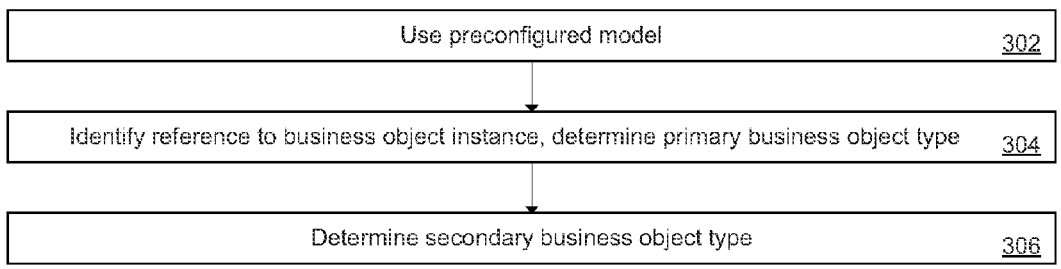
FIG. 12 is a flow diagram of a method according to an embodiment of the present invention.

FIG. 12 is a flow diagram of a method 300 according to an embodiment of the present invention. The method 300 relates to a user navigating within a database that contains business object instances. The method 300 may be performed by the computer system and network 200 (see FIG. 11).

At 302, a preconfigured model comprising preconfigured business object types and preconfigured associations of the business object types is used. The computer system and network 200 may use the preconfigured model, the preconfigured business object types, and the preconfigured associations; for example, the enterprise application 108, when executing, may manipulate data corresponding to the preconfigured model, the preconfigured business object types, and the preconfigured associations.

At 304, a reference to a business object instance within a software object is identified, and a primary business object type corresponding to the business object instance is determined. The computer system and network 200 may identify the reference to the business object instance, for example as a result of the user receiving an email message. The computer system and network 200 may then determine the primary business object type corresponding to the business object instance. For example, FIG. 1 shows a software object, the email message (1); the email message (1) includes the business object instance, the "shopping cart"; the primary business object type is "purchase request".

At 306, at least one secondary business object type associated with the primary business object type is determined in accordance with the preconfigured model. The computer system and network 200 may determine the secondary business object type associated with the primary business object type. For example, FIG. 4 shows the secondary business object types requests (4) and materials (5).

The method 300 may include further steps or substeps, the details of which are discussed above (with reference to FIG. 1 through FIG. 9) and are not repeated (for brevity).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for navigating within a database, the method comprising:
    storing, by a computer system, a plurality of business object instances and a business object model, wherein each of the plurality of business object instances has a corresponding one of a plurality of business object types, wherein a particular business object instance is an individual item in the database of a particular business object type, wherein each of the plurality of business object types has a plurality of associations with others of the plurality of business object types, and wherein the business object model includes all of the plurality of associations between the plurality of business object types;
    using, by the computer system, a preconfigured model comprising preconfigured business object types and preconfigured associations of the preconfigured business object types, wherein the preconfigured model has a subset of the associations of the business object model, wherein each of the preconfigured business object types corresponds to one of the plurality of business object types, and wherein at least one preconfigured business object type has fewer associations than a corresponding business object type that corresponds to the at least one preconfigured business object type;
    identifying, by the computer system, a reference to a business object instance within a software object and determining a primary business object type corresponding to the business object instance; and
    determining, by the computer system using the preconfigured model instead of the business object model, at least one secondary business object type associated with the primary business object type in accordance with the preconfigured model.

2. The method according to claim 1, further comprising:
    retrieving from the database, if present in the database, at least one attribute of at least one business object instance within the secondary business object type associated with the primary business object type in accordance with the preconfigured model.

3. The method according to claim 1, further comprising:
    retrieving from the database information relating to the business object instance referenced in the software object; and
    displaying information relating to the business object instance.

4. The method according to claim 1, wherein, upon selection of a link to a selected one of the at least one secondary business object type by the user, the determining is repeated using the selected secondary business object type corresponding to the link as a new primary business object type.

5. The method according to claim 1, wherein the preconfigured associations of the business object types comprised by the preconfigured model are a subset of associations of business object types comprised by a business object model used by the database.

6. The method according to claim 1, wherein the software object is one of a text file and an email.

7. The method according to claim 1, wherein the software object represents a structured content.

8. The method according claim 3, wherein retrieving from the database information relating to the business object referenced in the software object comprises:
    retrieving one or more business object attributes of the business object instance from the database.

9. The method according to claim 1, further comprising:
    providing at least one link to the at least one secondary business object type.

10. The method according to claim 9, wherein providing the at least one link comprises:
    displaying information relating to the business object instance within the secondary business object type.

11. A computer system for navigating within a database, comprising:
    a storage system that is configured to store a plurality of business object instances and a business object model, wherein each of the plurality of business object instances has a corresponding one of a plurality of business object types, wherein a particular business object instance is an individual item in the database of a particular business object type, wherein each of the plurality of business object types has a plurality of associations with others of the plurality of business object types, and wherein the business object model includes all of the plurality of associations between the plurality of business object types; and
    a processor system that is configured to use a preconfigured model comprising preconfigured business object types and preconfigured associations of the preconfigured business object types, wherein the preconfigured model has a subset of the associations of the business object model, wherein each of the preconfigured business object types corresponds to one of the plurality of business object types, and wherein at least one preconfigured business object type has fewer associations than a corresponding business object type that corresponds to the at least one preconfigured business object type,
    wherein the processor system is further configured to identify a reference to a business object instance within a software object and to determine a primary business object type corresponding to the business object instance, and
    wherein the processor system is further configured to determine, using the preconfigured model instead of the business object model, at least one secondary business object type associated with the primary business object type in accordance with the preconfigured model.

12. The computer system of claim 11, wherein the processor system is configured to execute a database application that controls the storage system to store the database.

13. The computer system of claim 11, wherein the processor system is configured to execute an enterprise application that uses the preconfigured model.

14. The computer system of claim 11, wherein the processor system is configured to execute a navigation application that identifies the reference to the business object instance and that determines the primary business object type.

15. The computer system of claim 11, wherein the processor system is configured to execute a navigation application that determines the at least one secondary business object type.

16. A computer program embodied in a tangible, non-transitory recording medium that is configured to control a computer system to execute processing for navigating within a database, the computer program comprising:
- a database application that is configured to control the computer system to store the a plurality of business object instances and a business object model, wherein each of the plurality of business object instances has a corresponding one of a plurality of business object types, wherein a particular business object instance is an individual item in the database of a particular business object type, wherein each of the plurality of business object types has a plurality of associations with others of the plurality of business object types, and wherein the business object model includes all of the plurality of associations between the plurality of business object types;
- an enterprise application that is configured to control the computer system to use a preconfigured model comprising preconfigured business object types and preconfigured associations of the preconfigured business object types, wherein the preconfigured model has a subset of the associations of the business object model, wherein each of the preconfigured business object types corresponds to one of the plurality of business object types, and wherein at least one preconfigured business object type has fewer associations than a corresponding business object type that corresponds to the at least one preconfigured business object type; and
- a navigation application that is configured to control the computer system to identify a reference to a business object instance within a software object and to determine a primary business object type corresponding to the business object instance, and
- wherein the navigation application is further configured to control the computer system to determine, using the preconfigured model instead of the business object model, at least one secondary business object type associated with the primary business object type in accordance with the preconfigured model.

17. The method according to claim 1, wherein the business object model provides a model of data stored in the database, wherein the data stored in the database is information of a plurality of attributes of the plurality of business object instances.

18. The method according to claim 1, wherein the business object model comprises a first model that provides a model of data stored in the database, wherein the data stored in the database is information of a plurality of attributes of the plurality of business object instances, and wherein the preconfigured model comprises a second model that provides a model of the first model.

19. The method according to claim 1, further comprising:
- displaying the business object instance and one or more links to at least one secondary business object instance, wherein the business object instance has the primary business object type, and wherein the at least one secondary business object instance has the at least one secondary business object type;
- receiving a user input corresponding to a selected link of the one or more links; and
- displaying a selected secondary business object instance in response to the user input, wherein the selected secondary business object instance corresponds to the selected link.

20. The method according to claim 1, further comprising:
- displaying the business object instance and a first set of links to at least one secondary business object instance, wherein the business object instance has the primary business object type, and wherein the at least one secondary business object instance has the at least one secondary business object type;
- receiving a first user input corresponding to a first selected link of the first set of links;
- displaying a selected secondary business object instance in response to the first user input, wherein the selected secondary business object instance corresponds to the first selected link;
- determining at least one tertiary business object type associated with the secondary business object type in accordance with the preconfigured model;
- displaying a second set of links to at least one tertiary business object instance, wherein the at least one tertiary business object instance has the at least one tertiary business object type;
- receiving a second user input corresponding to a second selected link of the second set of links; and
- displaying a selected tertiary business object instance in response to the second user input, wherein the selected tertiary business object instance corresponds to the second selected link.

* * * * *